Jan. 7, 1936.                F. A. WEINGARTNER                2,026,924
                              TRANSMISSION GEARING
                              Filed Sept. 1, 1934            2 Sheets-Sheet 1
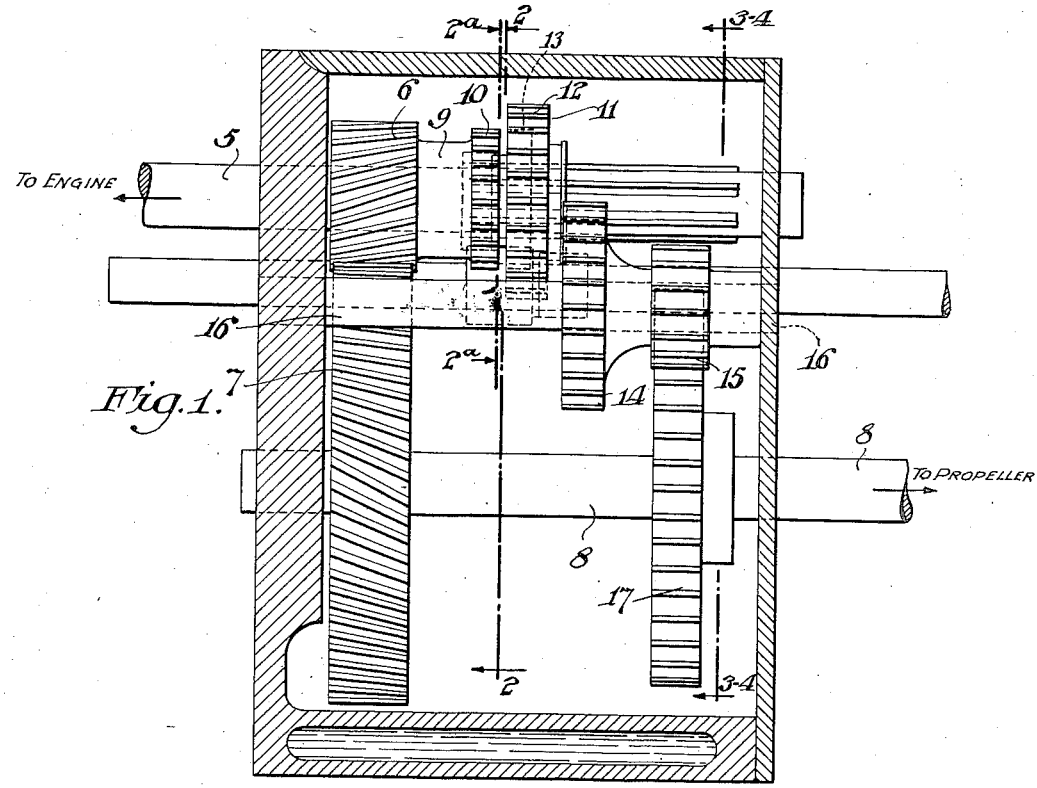
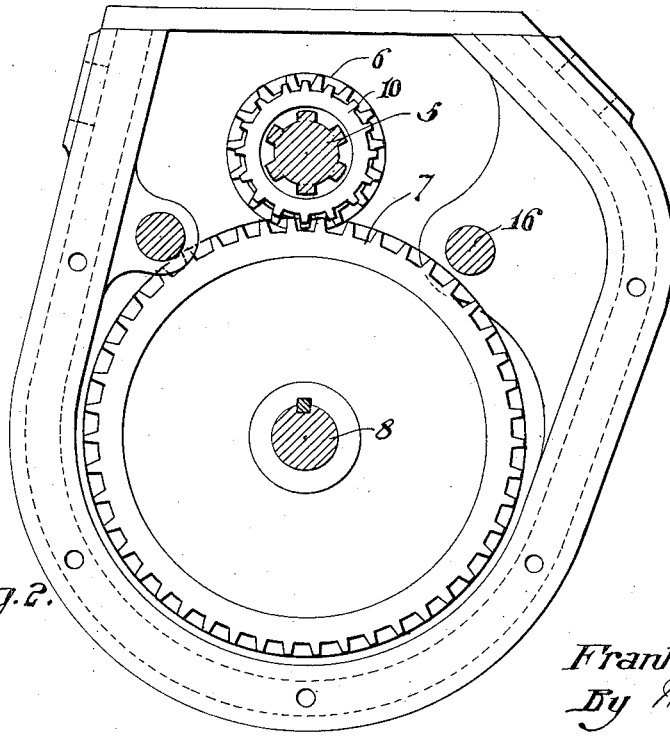
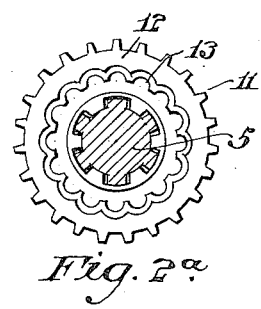
Inventor:
Frank A. Weingartner,
By Jno. Roadle
        Attorney.

Jan. 7, 1936.  F. A. WEINGARTNER  2,026,924
TRANSMISSION GEARING
Filed Sept. 1, 1934  2 Sheets-Sheet 2

Inventor:
Frank A. Weingartner,
By  Attorney.

Patented Jan. 7, 1936

2,026,924

UNITED STATES PATENT OFFICE 2,026,924

TRANSMISSION GEARING

Frank A. Weingartner, Philadelphia, Pa.

Application September 1, 1934, Serial No. 742,450

2 Claims. (Cl. 74—342)

The invention relates to an improved gear arrangement for transmitting power from the engine shaft to the propeller shaft. The invention is especially applicable for adapting certain types of automobile engines for Marine service.

The invention is characterized by the improved means for selectively transmitting the power from a driving to a driven shaft, for direct drive at a given ratio, for reverse drive, and for direct drive with change of ratio, so that the propeller shaft may be driven at same normal speed for the first forward drive and for reverse drive, and at a relatively greater speed for second forward drive, called sailing speed.

Referring to the drawings, which illustrate merely by way of example, suitable means for effecting the invention;—

Fig. 1 is an elevation of the gearing, the casing being in section.

Fig. 2 is a section on line 2, 2 of Fig. 1.

Fig. 2a is a section on the line 2ª, 2ª when the element 11 is moved to the left to bring the clutch elements together.

Figure 4:
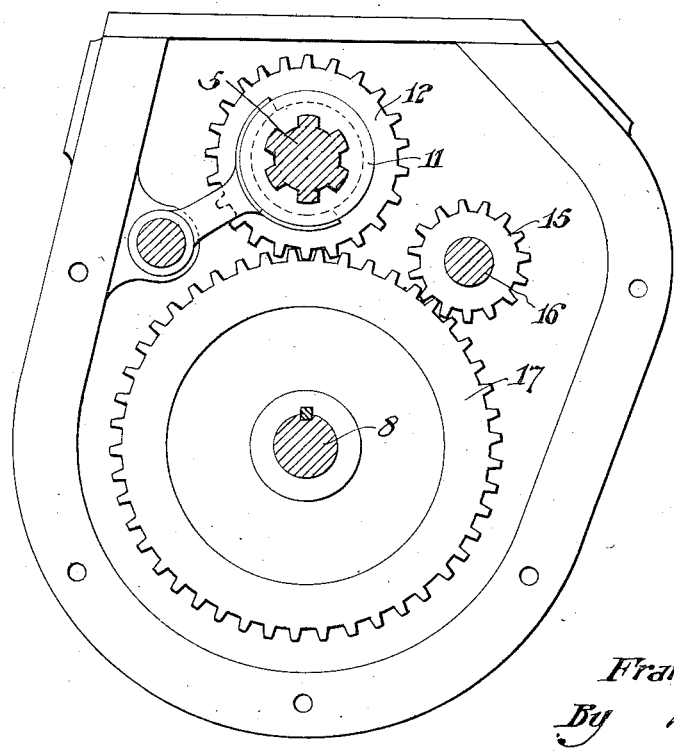

Fig. 4 is a section on line 4, 4 of Fig. 1 where elements 11 and 17 cooperate.

Similar numerals refer to similar parts throughout the several views.

The engine shaft 5 is provided with a spiral gear or pinion 6 loosely mounted thereon, and meshing with spiral gear wheel 7 which is keyed to the propeller shaft 8, the ratio of spiral gear teeth being 15 to 46.

The gear wheel 6 has an extension or hub 9 provided with a clutch element 10.

A gear wheel 11 is feathered on the shaft 5, and is provided with external gear teeth 12, and internal clutch formation 13. This gear wheel 11 is adapted to slide on shaft 5, toward pinion 6, in order to bring clutch elements 10 and 13 into cooperation, thus locking pinion 6 to rotate with shaft 5. In this position of the parts, there is a direct forward drive from engine shaft to propeller shaft with ratio of teeth, as above stated, of 15 to 46.

When gear wheel 11 is moved to the right, away from clutch element 10, to position shown in Fig. 1, it will be in neutral position and pinion 6 will not rotate with engine shaft 5.

Figure 3:
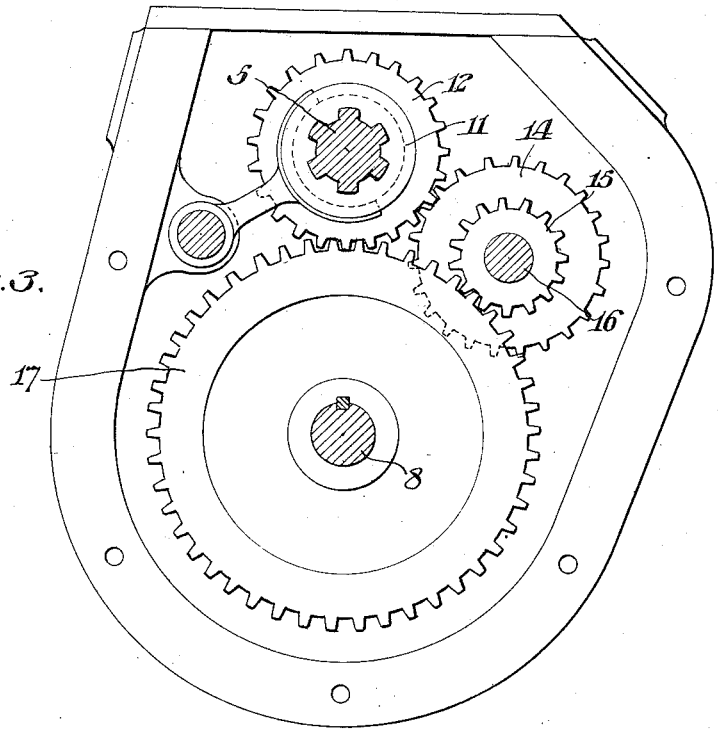
Fig. 3 is a section on line 3, 3 of Fig. 1 with the reverse gear effective.

When gear wheel 11 is moved further to the right, it will come into mesh with pinion 14 of the reverse gear formation 14—15, mounted on shaft 16. The pinion 15 is in constant mesh with gear wheel 17 mounted on and keyed to propeller shaft 8. In this position of gear wheel 11, as shown in Fig. 3, the propeller shaft is turned in reverse direction, the ratio of teeth being 15 to 46. That is, the reverse drive has the same ratio as the above mentioned direct or forward drive.

When gear wheel 11 is moved or shifted still further to the right, it will come into direct mesh with gear wheel 17, as indicated in Fig. 4, thus establishing direct drive from engine shaft 5 to propeller shaft 8, but at a relatively increased forward speed ratio, being 23 to 46. This is called the "sailing drive" or speed.

In Fig. 3 gear wheel 11 is in mesh with gear wheel 14 and not with gear wheel 17, while in Fig. 4, gear wheel 11 is in mesh with gear wheel 17 and not with gear wheel 14.

The gear wheel 11 is shifted from left to right and vice versa, by the usual conventional lever-shift, common to most shift gears.

By the arrangement of selective gear transmission above described, we may have (1) a direct or forward drive between engine shaft and propeller shaft at normal or predetermined ratio, (2) a neutral position when no power is transmitted to the propeller shaft (3) a reverse drive also at the same ratio and (4) a direct or forward drive at relatively increased speed, called sailing speed.

What I claim is:—

1. In a transmission gearing for marine service, the combination of a driving shaft and a driven shaft, and means for selectively transmitting power, from the driving to the driven shaft, for direct drive at a given speed ratio, for reverse drive, and for a second direct drive at a relatively increased speed, comprising a pinion loosely mounted on the driving shaft and provided with a clutch formation, a gear wheel splined on the driving shaft and provided with a cooperating clutch formation, a forward drive normal speed gear wheel keyed on the driven shaft and in constant mesh with the loosely mounted gear wheel, a second forward drive gear wheel of different ratio, keyed on the driven shaft, and a loosely mounted reverse gear formation having a pinion in constant mesh with the second forward-drive gear-wheel, and a pinion adapted to cooperate with the splined gear wheel, the splined gear wheel having a range of movements to and from positions cooperating with the first mentioned loosely mounted pinion, the pinion of the reversed gear formation, and the second forward drive gear wheel.

2. In a transmission gearing for marine service, the combination of a driving shaft and a driven shaft, and means for selectively transmitting power, from the driving to the driven shaft, for direct drive at a given speed ratio, for reverse drive, and for a second direct drive at a relatively increased speed, comprising a pinion loosely mounted on the driving shaft and provided with a clutch formation, a gear wheel splined on the driving shaft and provided with a cooperating clutch formation, a forward drive normal speed gear wheel keyed on the driven shaft and in constant mesh with the loosely mounted gear wheel, a second forward drive gear wheel of different ratio, keyed on the driven shaft, and a loosely mounted reverse gear formation having a pinion in constant mesh with the second forward-drive gear-wheel, and a pinion adapted to cooperate with the splined gear wheel, the splined gear wheel having a range of movements to and from positions cooperating with the first mentioned loosely mounted pinion, the pinion of the reversed gear formation, and the second forward drive gear wheel, the elements so arranged that the reverse drive is secured by bringing the splined gear wheel into a position intermediate the two forward drive gear wheels.

FRANK A. WEINGARTNER.